(12) United States Patent
Hu

(10) Patent No.: US 7,665,429 B2
(45) Date of Patent: Feb. 23, 2010

(54) SWIRL-INJECTION TYPE EIGHT-STROKE ENGINE

(76) Inventor: Lung-tan Hu, 25755 48th Ave., Aldergrove, British Columbia (CA) V4W 1J6

( * ) Notice: Subject to any disclaimer, the term of this patent is extended or adjusted under 35 U.S.C. 154(b) by 0 days.

(21) Appl. No.: 12/586,633

(22) Filed: Sep. 25, 2009

(65) Prior Publication Data

US 2010/0012082 A1    Jan. 21, 2010

(51) Int. Cl.
*F02B 75/02* (2006.01)
*F02M 25/07* (2006.01)

(52) U.S. Cl. .................. 123/58.8; 123/568.13; 60/620

(58) Field of Classification Search ............... 123/58.8, 123/568.13; 60/620
See application file for complete search history.

(56) References Cited

U.S. PATENT DOCUMENTS

| | | | | |
|---|---|---|---|---|
| 3,896,774 A * | 7/1975 | Siewert | ...................... | 123/58.8 |
| 3,924,576 A * | 12/1975 | Siewert | ...................... | 123/1 R |
| 3,958,540 A * | 5/1976 | Siewert | ...................... | 123/58.8 |
| 3,991,721 A * | 11/1976 | Hurd | ........................... | 123/1 R |
| 4,159,699 A * | 7/1979 | McCrum | .................... | 123/58.8 |
| 4,159,700 A * | 7/1979 | McCrum | .................... | 123/58.8 |
| 4,202,300 A * | 5/1980 | Skay | .......................... | 123/432 |
| 4,422,430 A * | 12/1983 | Wiatrak | ................. | 123/568.13 |
| 4,917,054 A * | 4/1990 | Schmitz | ...................... | 123/58.8 |
| 5,056,471 A * | 10/1991 | Van Husen | ................ | 123/51 R |
| 5,178,119 A * | 1/1993 | Gale | ...................... | 123/568.12 |
| 5,199,262 A * | 4/1993 | Bell | ............................ | 60/622 |
| 6,308,666 B1 * | 10/2001 | Drecq | ....................... | 123/58.8 |
| 6,328,003 B1 * | 12/2001 | Gaertner et al. | ............ | 123/58.8 |
| 6,918,358 B2 * | 7/2005 | Hu | .............................. | 123/58.8 |
| 7,096,833 B2 * | 8/2006 | Hitomi et al. | ............... | 123/58.8 |
| 7,219,634 B2 * | 5/2007 | Hitomi et al. | ............... | 123/58.8 |
| 2003/0070635 A1 * | 4/2003 | Scuderi et al. | ............ | 123/58.8 |
| 2008/0134999 A1 * | 6/2008 | Almkvist et al. | ........... | 123/58.8 |
| 2009/0056670 A1 * | 3/2009 | Zhao et al. | ................. | 123/25 P |

* cited by examiner

*Primary Examiner*—Erick Solis

(57) ABSTRACT

The present invention provides a swirl-injection type eight-stroke engine capable of constantly varying the injection-direction of the high-density-air from the slave cylinder, thereby effectively circulating the high-density-air around the master cylinder wall and master cylinder head during the injection process to speed up the mixing of the high-density-air and the hot combustion medium in the master cylinder, furthermore the hot spots in the master cylinder head and the master cylinder wall are eliminated with the two-direction swirling effect during the cold-expansion process.

20 Claims, 22 Drawing Sheets

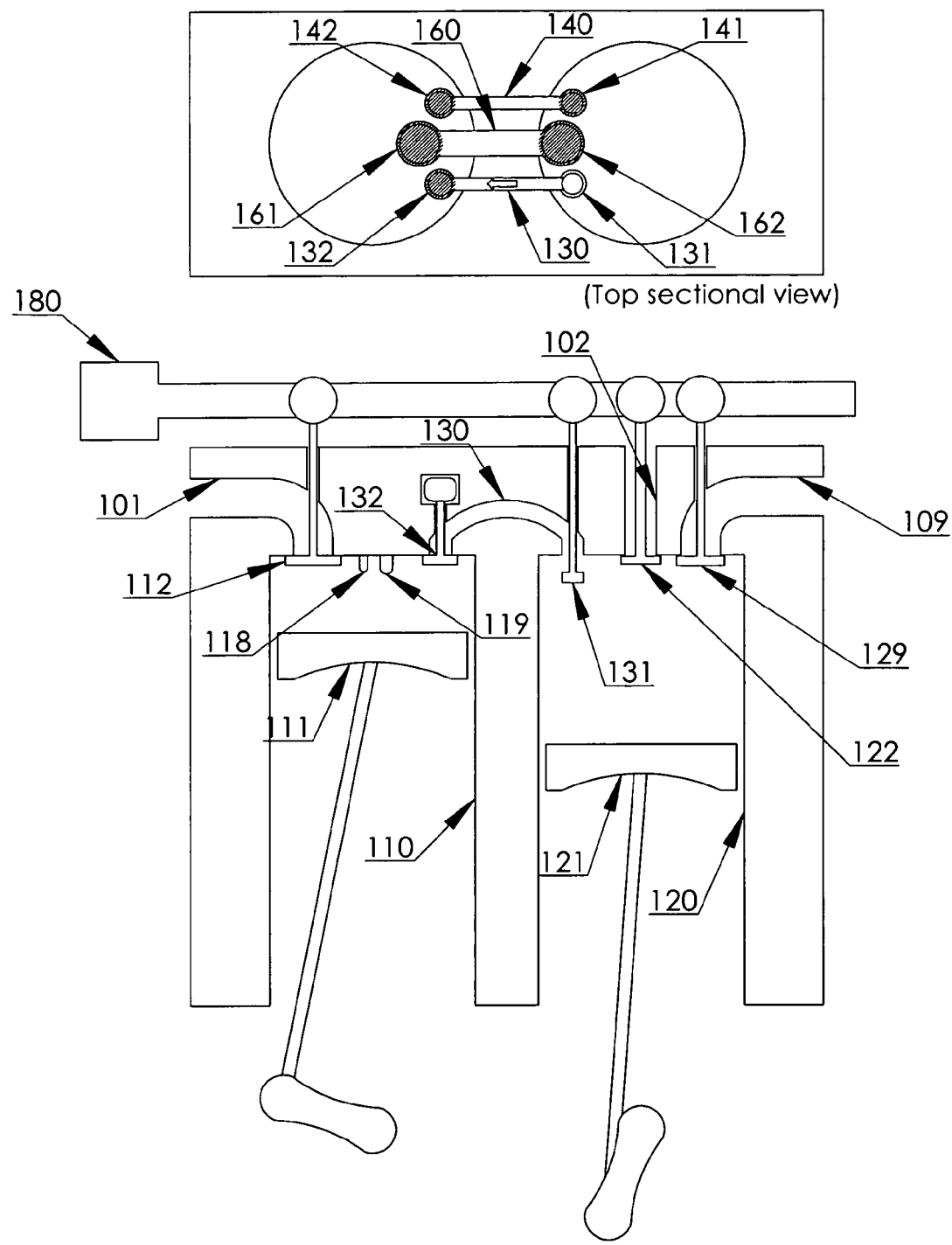
FIG.1Dcw

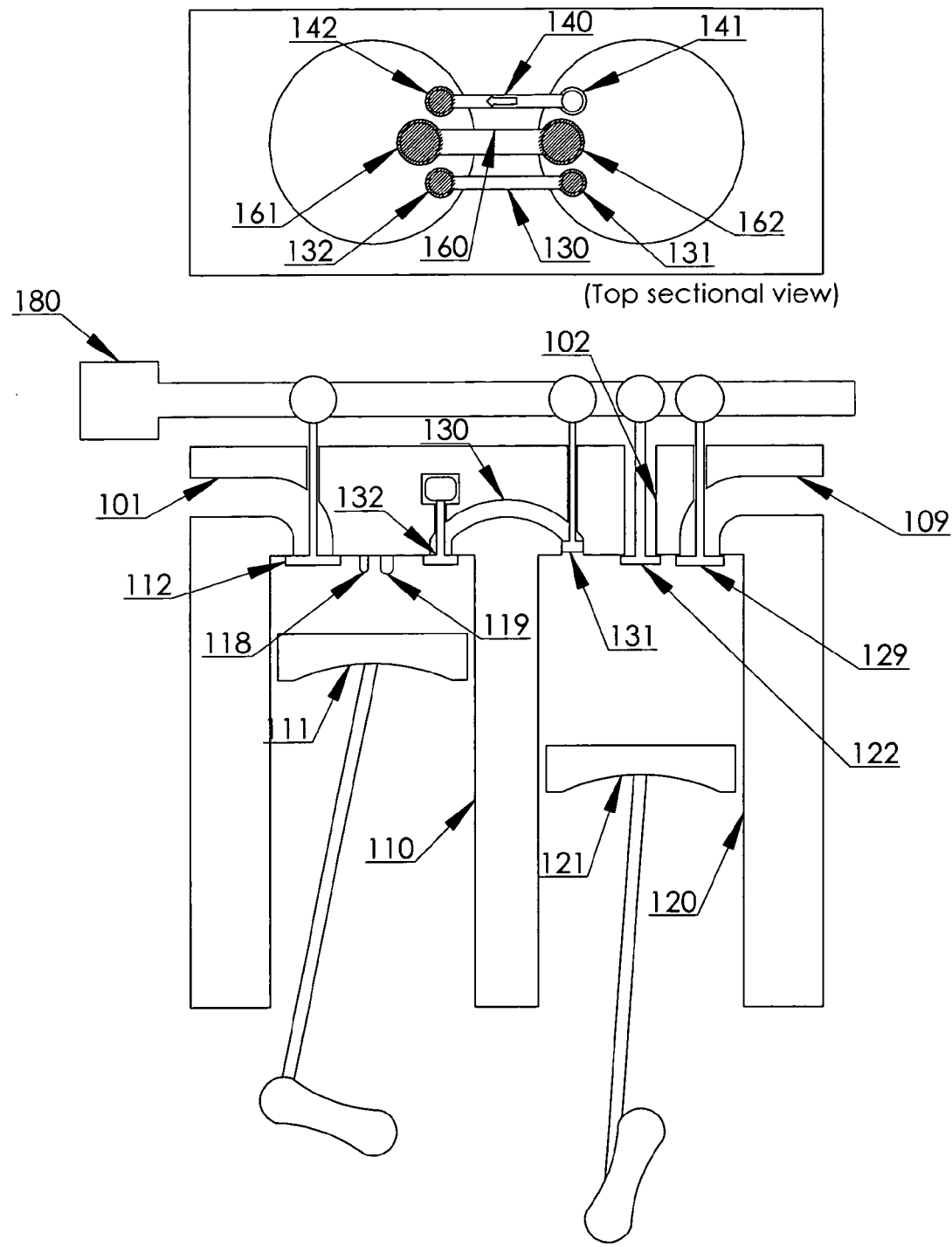
FIG.1Dccw

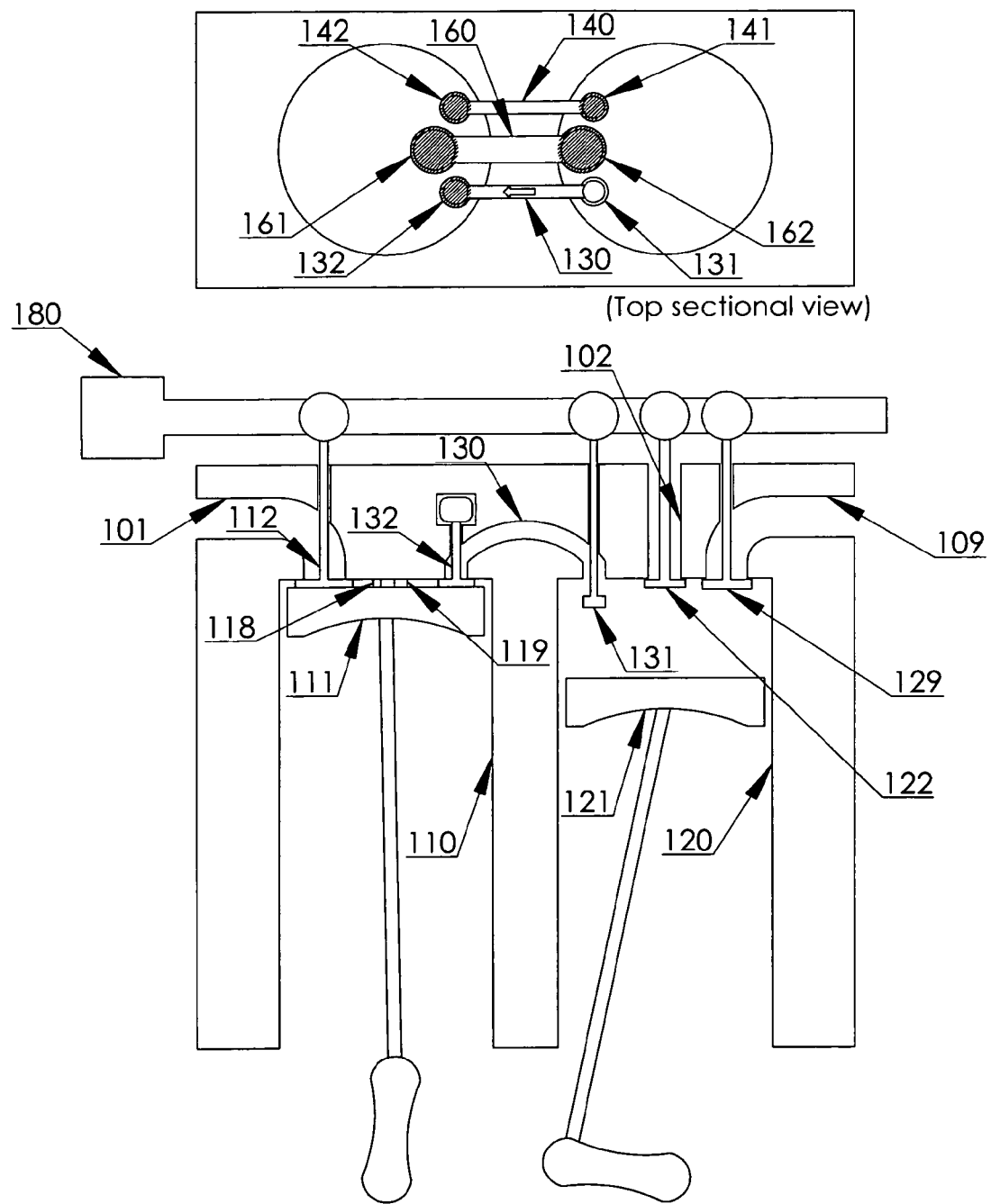
FIG.1Ecw

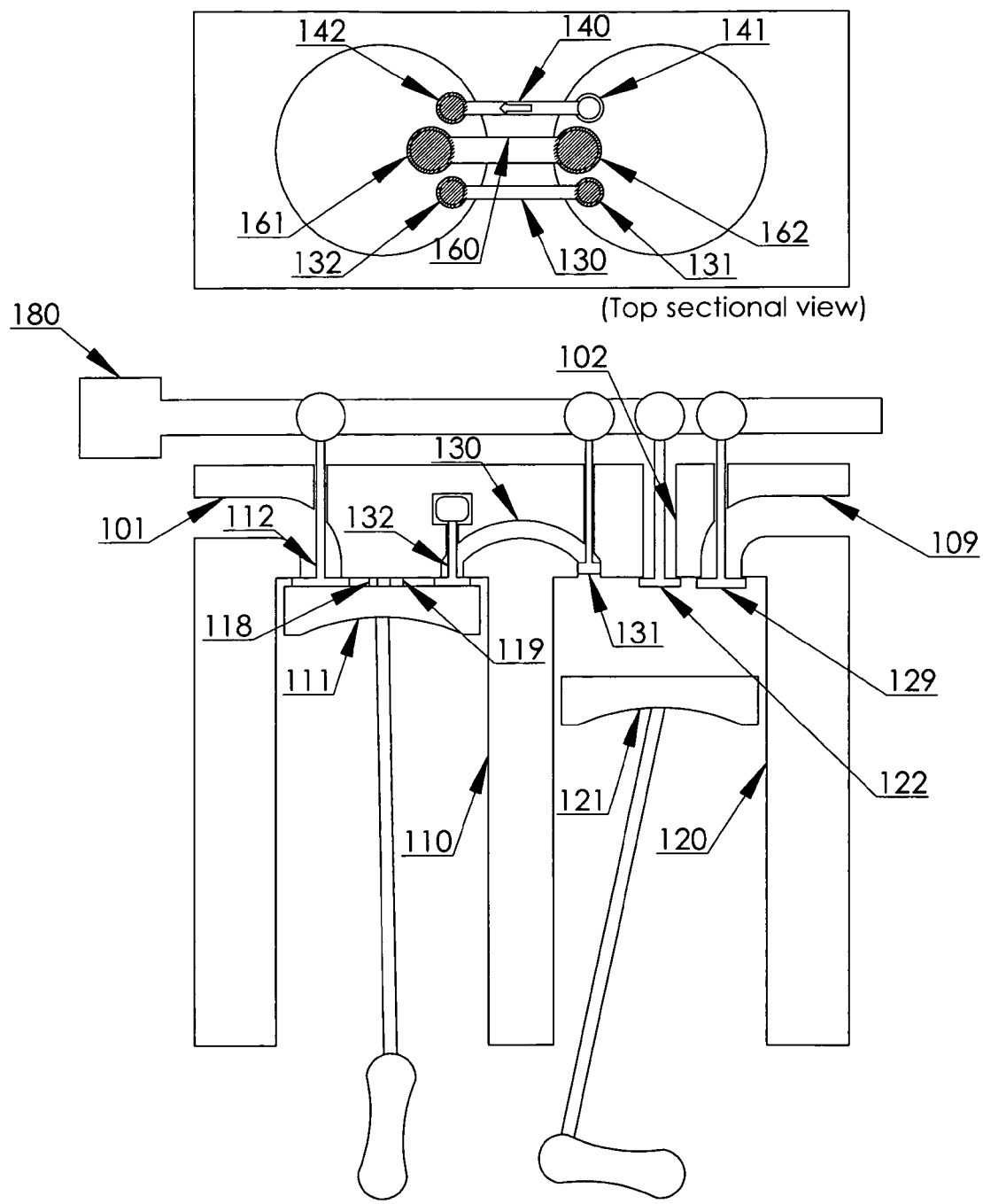
FIG.1Eccw

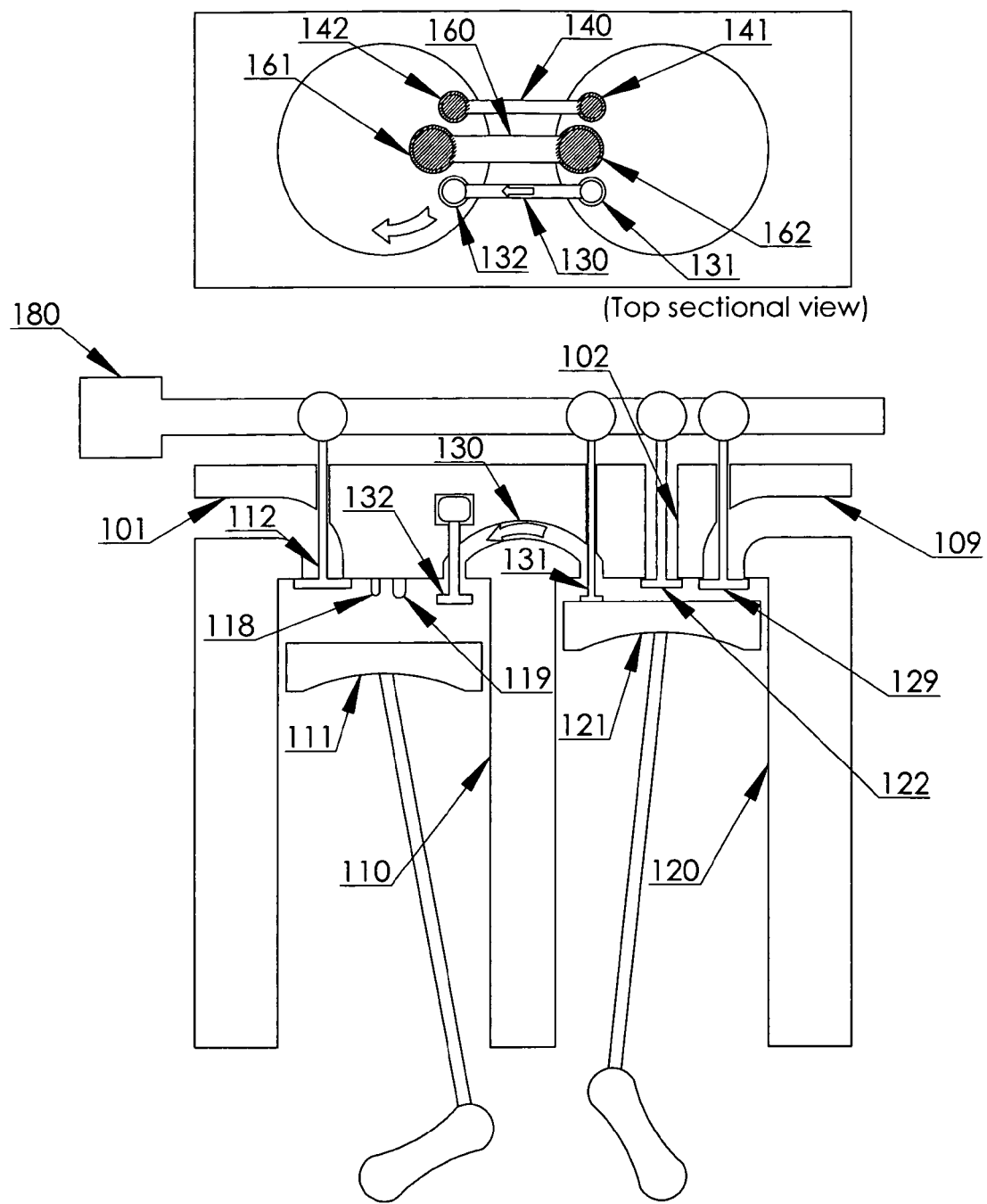
FIG.1Fcw
(Top sectional view)

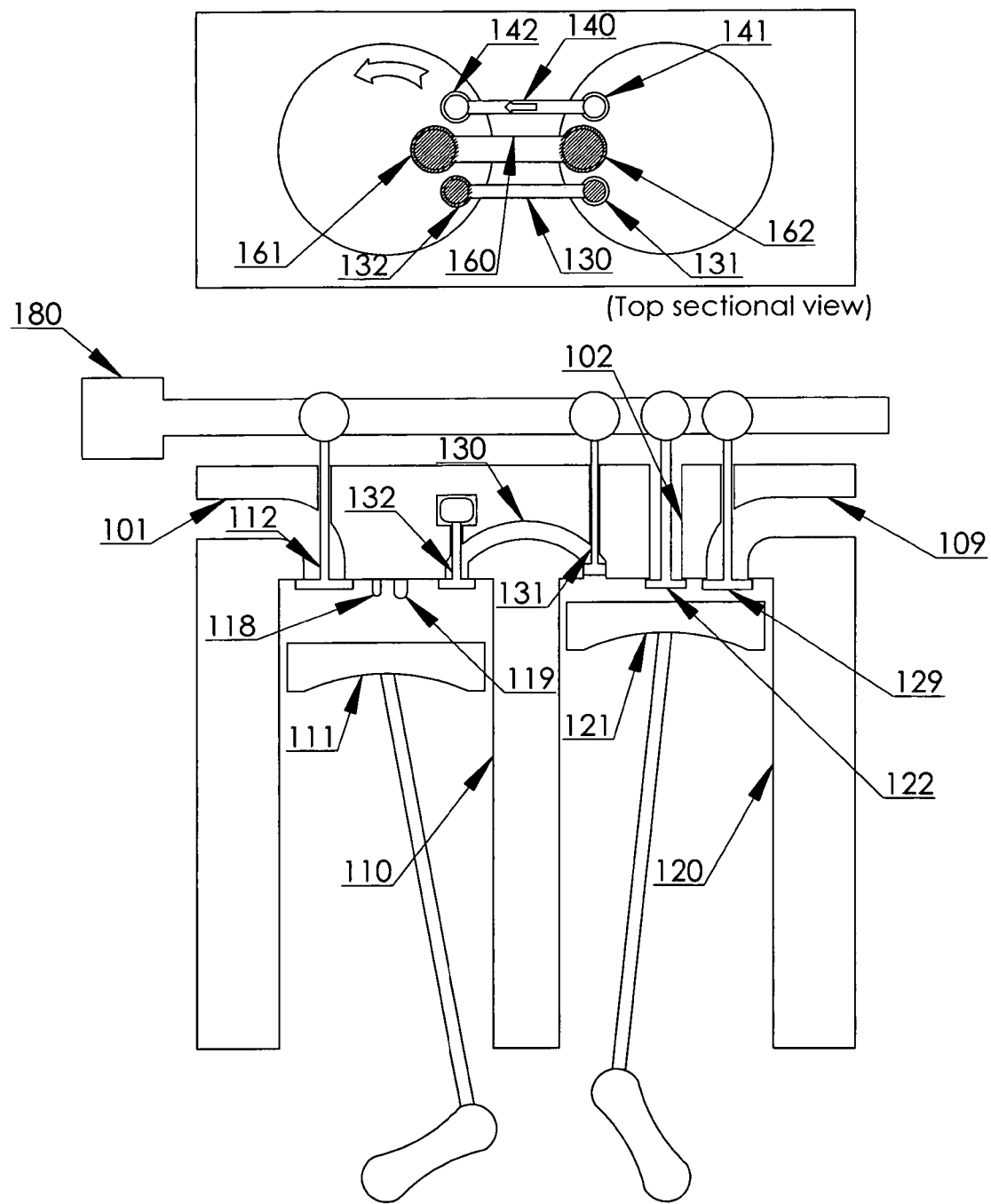
FIG.1Fccw
(Top sectional view)

(Top sectional view)

(Top sectional view)

Charge-output-valve with air-guiding-grooves

Flat-type eight-stroke engine

Operation Table.1 part A  (0 degree to 810 degree crankshaft reference angle)

8-stroke operation configured with 90 degree phase-difference

| | 1st*<br>(FIG.1A) | 2nd*<br>(FIG.1B) | 3rd*<br>(FIG.1C) | 4th*<br>(FIG.1Dcw) | 5th*<br> | 6th*<br>(FIG.1G) | 7th*<br>(FIG.1G) | 8th*<br>(FIG.1H) | 1st* |
|---|---|---|---|---|---|---|---|---|---|
| Master Cylinder | master-intake-stroke | | master-compression-stroke | | master-expansion-stroke | | master-expansion-stroke | master-exhaust-stroke | |
| Slave Cylinder | 8th* | slave-intake-stroke | | slave-compression-stroke | | | slave-expansion-stroke | 8th*<br>(FIG.1H) slave-exhaust-stroke | |
| Crankshaft Reference Angle | 0    90    180    270    360    450    540    630    720    810 |

First round of 8-process-sequence note:
1st = the master-intake-process (FIG.1A)
2nd = the slave-intake-process (FIG.1B)
3rd = the master-compression-process (FIG.1C)
4th = the slave-compression-process (FIG.1Dcw)
5th = the hot-combustion-process (FIG.1Ecw)
6th = the injection-process (FIG.1Fcw)
7th = the cold-expansion-process (FIG.1G)
8th = the slave-exhaust-process (FIG.1H)

Operation Table.1 part B  (720 degree to 1530 degree crankshaft reference angle)

8-stroke operation configured with 90 degree phase-difference

| Master Cylinder | 1st* (FIG.1A) | | 3rd* (FIG.1C) | | 5th* | 6th* | 7th* (FIG.1G) | 8th* (FIG.1H) | | 1st* |
|---|---|---|---|---|---|---|---|---|---|---|
| | master-intake-stroke | | master-compression-stroke | | master-expansion-stroke | | | master-exhaust-stroke | | |
| Slave Cylinder | 8th* | 2nd* (FIG.1B) | | 4th* (FIG.1Dccw) | | 6th* | 7th* (FIG.1G) | | 8th* (FIG.1H) | |
| | | slave-intake-stroke | | slave-compression-stroke | | | slave-expansion-stroke | | slave-exhaust-stroke | |
| Crankshaft Reference Angle | 720   810 | 900 | 990 | 1080 | 1170 | 1260 | 1350 | 1440 | 1530 |

Second round of 8-process-sequence note:
1st = the master-intake-process (FIG. 1A)
2nd = the slave-intake-process (FIG.1B)
3rd = the master-compression-process (FIG.1C)
4th = the slave-compression-process (FIG.1Dccw)
5th = the hot-combustion-process (FIG.1Eccw)
6th = the injection-process (FIG.1Fccw)
7th = the cold-expansion-process (FIG.1G)
8th = the slave-exhaust-process (FIG.1H)

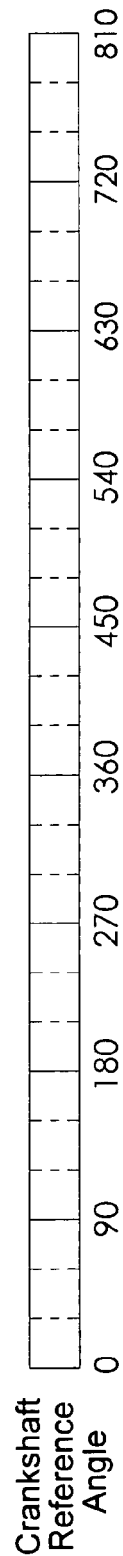

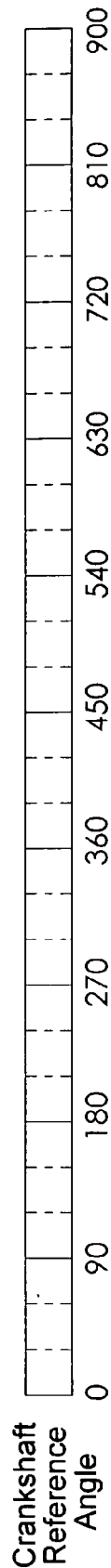

Operation Table.3 (0 degree to 900 degree crankshaft reference angle)

8-stroke operation configured with 150 degree phase-difference

| | | | | | | | | | |
|---|---|---|---|---|---|---|---|---|---|
| Master Cylinder | | 1st* | | 3rd* | 5th* | 6th* | 7th* | 8th* | 1st* |
| | | master-intake-stroke | | master-compression-stroke | master-expansion-stroke | | master-exhaust-stroke | | |
| Slave Cylinder | 8th* | | 2nd* | | 4th* | 6th* | 7th* | 8th* | |
| | | | slave-intake-stroke | | slave-compression-stroke | slave-expansion-stroke | | slave-exhaust-stroke | |
| Crankshaft Reference Angle | 0 | 90 | 180 | 270 | 360 | 450 | 540 | 630 | 720 | 810 | 900 |

8-process-sequence note:
1st = the master-intake-process
2nd = the slave-intake-process
3rd = the master-compression-process
4th = the slave-compression-process
5th = the hot-combustion-process
6th = the injection-process
7th = the cold-expansion-process
8th = the slave-exhaust-process

SWIRL-INJECTION TYPE EIGHT-STROKE ENGINE

FIELD OF THE INVENTION

The present invention relates to an advanced engine configuration of the eight-stroke internal combustion engine; and more particularly to an improvement on the coordination system of the eight-stroke engine.

The present invention can be used in the field of transportation vehicle, power generation.

BACKGROUND OF THE INVENTION

The present invention incorporates by reference the eight-stroke internal combustion engine, which was filed as U.S. Pat. No. 6,918,358 (application Ser. No. 10/619,147), and the engine of this type can also be abbreviated as the eight-stroke engine.

The original eight-stroke engine design has two major drawbacks, one is the uneven heat current distribution through the master cylinder wall and the master cylinder head, which reduces the durability of the eight-stroke engine in continuous heavy load operation, the other is the long mixing time required for the high-density-air to mix with the hot-combusting medium in the master cylinder during the injection process, which lowers the fuel efficiency of the eight-stroke engine that operates in high rpm condition. In order to overcome the above-mentioned technical difficulties, the present invention provides an improved configuration of the eight-stroke engine.

The present invention focuses on improving the fuel efficiency of the eight-stroke engine and shorten the mixing time of the high-density-air and the hot-combustion-medium in the master cylinder during the injection-process; as the reduction of the mixing time can directly decrease the heat current through the master cylinder wall, and the two-direction swirling effect can maintain the entire surface area of the master cylinder wall at about the same operating temperature, which results in a low heat loss environment for the cold-expansion-process, thereby achieving an overall fuel efficiency over 35% for the gasoline type eight-stroke engine and 45% for the diesel type eight-stroke engine even in small vehicle application.

In addition, it is also possible to employ an alternating-sparking-sequence with at least more than two spark plugs to enhance the two-direction swirling effect.

SUMMARY OF THE INVENTION

It is the main objective of the present invention to provide a swirl-injection type eight-stroke engine that can constantly vary the injection direction of the high-density-air from the slave cylinder into the master cylinder to shorten the mixing time and the provide a low heat loss environment in the master cylinder during the cold-expansion-process.

It is the second objective of the present invention to provide a swirl-injection type eight-stroke engine that can sustain long-term heavy load and high rpm operation.

It is the third objective of the present invention to provide a swirl-injection type eight-stroke engine that can maintain high fuel efficiency in both the light load and heave load conditions.

BRIEF DESCRIPTION OF THE DRAWINGS

FIG. 1A to FIG. 1H are the illustrative views of the swirl-injection type eight-stroke engine configured with 90 degree phase difference in different processes, wherein the top sectional view shows the valve conditions of the charge-input-valves and the charge-output-valves and the reverse-input-valve and the reverse-output-valve, wherein the shading of the valve indicates that the valve is shut.

FIG. 1A is the illustrative view of the swirl-injection type eight-stroke engine in the master-intake-process at about 30 degree of crankshaft reference angle, the master-intake-valve is open to admit air into the master cylinder during this process, wherein all the charge-output-valves and the charge-input-valves and the reverse-input-valve and the reverse-output-valves are shut.

FIG. 1B is the illustrative view of the swirl-injection type eight-stroke engine in the slave-intake-process at about 120 degree of crankshaft reference angle, the slave-intake-valve is open to admit air into the slave cylinder during this process, wherein all the charge-output-valves and the charge-input-valves and the reverse-input-valve and the reverse-output-valves are shut.

FIG. 1C is the illustrative view of the swirl-injection type eight-stroke engine in the master-compression-process at about 220 degree of crankshaft reference angle, the master piston is compressing the air in the master cylinder during this process, wherein all the charge-output-valves and the charge-input-valves and the reverse-input-valve and the reverse-output-valves are shut.

FIG. 1Dcw is the illustrative view of the swirl-injection type eight-stroke engine in the slave-compression-process for clockwise injection at about 290 degree of crankshaft reference angle, the slave piston is compressing the air into the first-charge-channel during this process, wherein the first-charge-input-valve is opened with the camshaft system to allow the air to be compressed into the first-charge-channel.

FIG. 1Dccw is the illustrative view of the swirl-injection type eight-stroke engine in the slave-compression-process for counterclockwise injection at about 1010 degree (the second round) of crankshaft reference angle, the slave piston is compressing the air into the second-charge-channel during this process, wherein the second-charge-input-valve is opened with the cam system to allow the air to be compressed into the second-charge-channel.

FIG. 1Ecw is the illustrative view of the swirl-injection type eight-stroke engine in the hot-combustion-process for clockwise injection at about 365 degree of crankshaft reference angle, the air-fuel-mixture is ignited and combusted in the master cylinder during this process; wherein the second-charge-input-valve is opened with the cam system to compress the air into the first-charge-channel.

FIG. 1Eccw is the illustrative view of the swirl-injection type eight-stroke engine in the hot-combustion-process for counter-clock-wise injection at about 1085 degree of crankshaft reference angle, the air-fuel-mixture is ignited and combusted in the master cylinder during this process; wherein the first-charge-input-valve is opened with the cam system to allow the air to be compressed into the first-charge-channel.

FIG. 1Fcw is the illustrative view of the swirl-injection type eight-stroke engine in the injection-process for clockwise injection at about 420 degree of crankshaft reference angle, wherein the high-density-air of the first-charge-channel will open the first-charge-output-valve by the pressure difference, and a flow of high-density-air is injected from the first-charge-channel to create a clockwise swirling flow in the master cylinder during this process.

FIG. 1Fccw is the illustrative view of the swirl-injection type eight-stroke engine in the injection-process for counter-clockwise injection at about 1140 degree of crankshaft reference angle, wherein the high-density-air of the secondcharge-channel will open the second-charge-output-valve by the pressure difference, and a flow of high-density-air is injected from the second-charge-channel to create a counter-clockwise swirling flow in the master cylinder during this process.

FIG. 1G is the illustrative view of the swirl-injection type eight-stroke engine in the cold-expansion-process at about 460 degree of crankshaft reference angle, the cold-expansion-medium in the master cylinder continues to expand in both the master cylinder and the slave cylinder, and a flow of the cold-expansion-medium is flowing from the master cylinder into the slave cylinder through the reverse-channel during this process; all the charge-input-valves and the charge-output-valves are shut, the reverse-input-valve and the reverse-output-valve are open with the cam system during this process.

FIG. 1H is the illustrative view of the swirl-injection type eight-stroke engine in the slave-exhaust-process at about 535 degree of crankshaft reference angle, the cold-expansion-medium is expelled through the slave exhaust port during this process.

Figure 1A:
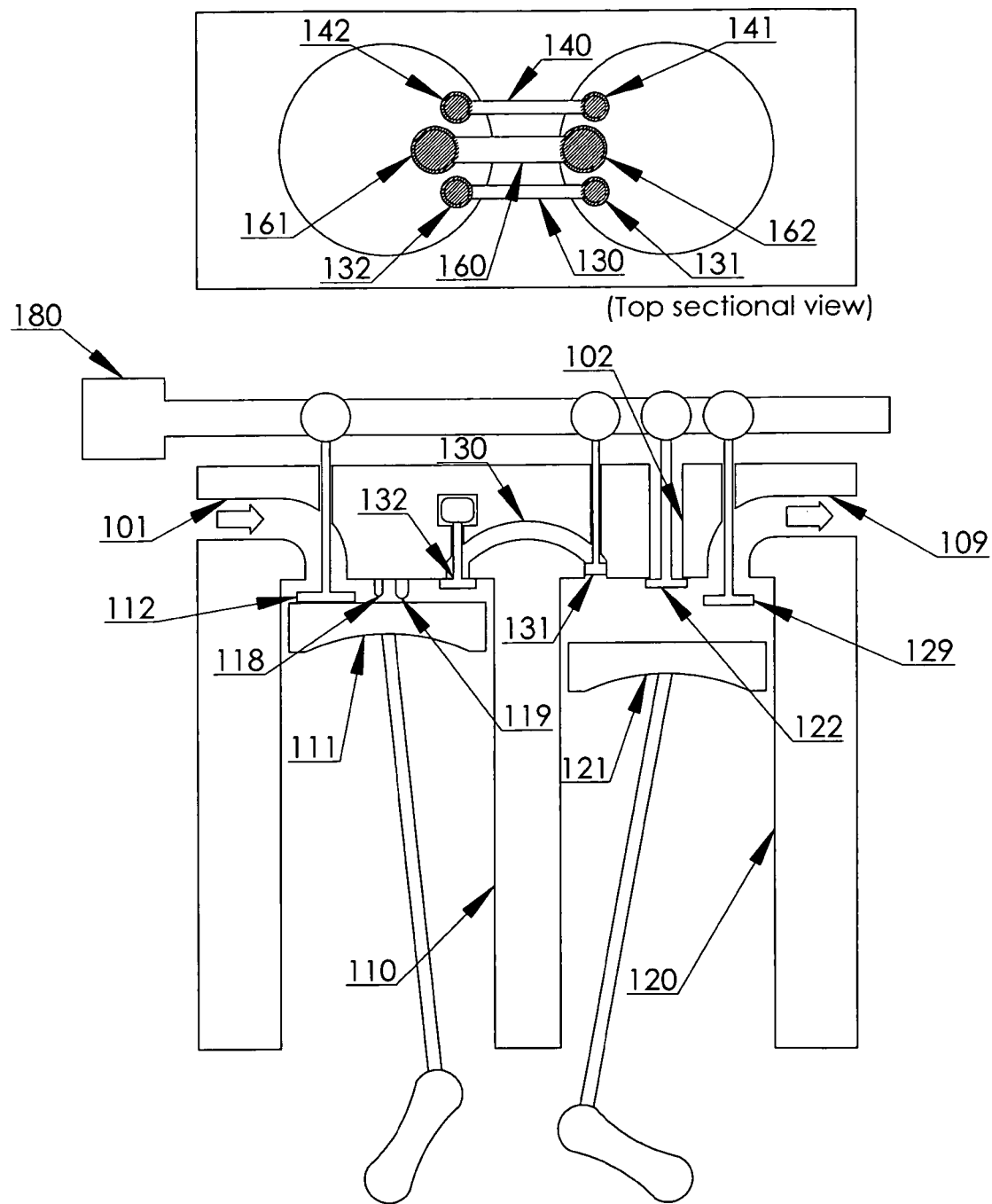

Operation Table.1. Part.A and Operation Table.1 Part.B show the relation between the eight-stroke-operation and the 8-process-sequence with the crankshaft reference angle scale, wherein the swirl-injection type eight-stroke engine is configured with 90 degree phase-difference.

Operation Table.2 shows the relation between the eight-stroke-operation and the 8-process-sequence with the crankshaft reference angle scale, wherein the swirl-injection type eight-stroke engine is configured with 75 degree phase-difference.

Operation Table.3 shows the relation between the eight-stroke-operation and the 8-process-sequence with the crankshaft reference angle scale, wherein the swirl-injection type eight-stroke engine is configured with 150 degree phase-difference.

DETAILED DESCRIPTION OF THE PREFERRED EMBODIMENTS

The swirl-injection type eight-stroke engine is an advanced eight-stroke engine developed from the eight-stroke internal combustion engine, which also operates in the basis of the eight-stroke-operation, the eight-stroke-operation consists of eight piston stroke performed by the master piston and the slave piston, which are the master-intake-stroke, the slave-intake-stroke, the master-compression-stroke, the slave-compression-stroke, the master-expansion-stroke, the slave-expansion-stroke, the master-exhaust-stroke, the slave-exhaust-stroke; however, to precisely describe the detailed operation of the swirl-injection type eight-stroke engine, the eight-stroke-operation will be elaborated with the 8-process-sequence, which describes the eight-stroke-operation in respect to the air flows in the master cylinder and the slave cylinder.

The master-intake-stroke, the master-expansion-stroke, the slave-intake-stroke and the slave-expansion-stroke are down-strokes; the master-compression-stroke, the master-exhaust-stroke, the slave-compression-stroke and the slave-exhaust-stroke are up-strokes.

The basic components of the swirl-injection type eight-stroke engine comprises a set of a master cylinder and a slave cylinder and an alternating-charge cam system; said master cylinder includes a master piston, said slave cylinder includes a slave piston, wherein said master piston and said slave piston must have a phase-difference between 60 degree and 150 degree to perform the 8-process-sequence.

Operation Table.1 to Operation Table.3 demonstrate the relationship between the 8-process-sequence and the eight-stroke-operation with various phase-difference configurations, it should be noted that the strokes mentioned in the eight-stroke-operation (such as the master-intake-stroke and the slave-intake-stroke) refers only to the downward motion or the upward motion of the master piston and the slave piston, the actual valve open-time or the air flow direction is defined with the 8-process-sequence; for example the master-intake-stroke is from 0 degree to 180 degree of crankshaft reference angle but the master-intake-process may be as long as 270 degree with the master intake valve opening opened from 0 degree to 270 degree; for another example, the master-exhaust-stroke is from 540 degree to 720 degree but the slave-exhaust-process of the eight-stroke engine is solely depending on the actuation time of the slave-exhaust-valve. Therefore the present invention will use 8-process-sequence to provide a better understanding of the eight-stroke engine concept.

The 8-process-sequence includes the master-intake-process, the slave-intake-process, the master-compression-process, the slave-compression-process, the hot-expansion-process, the injection-process, the cold-expansion-process, the slave-exhaust-process.

The master-intake-process is the process that the master-intake-valve opens to provide the air into the master cylinder.

The slave-intake-process is the process that the slave-intake-valve opens to provide the air into the slave cylinder.

The master-compression-process is the process that the master piston compresses the air in the master cylinder after the master-intake-valve is shut.

The slave-compression-process is the process that the slave piston compresses the air into one of the first-charge-channel and the second-charge-channel with the alternating-charge cam system; the first-charge-input-valve and the second-charge-input-valve will be actuated in an alternating order, so that one of the first-charge-channel and the second-charge-channel is disabled in an alternating order; for example when the first-charge-input-valve is open to compress the air into the first-charge-channel, the second-charge-input-valve will be shut to disable the second-charge-channel in the first round of the eight-stroke-operation; in the next round of the eight-stroke-operation, the second-charge-input-valve is open to compress the air into the second-charge-channel and the first-charge-input-valve is shut to disable the first-charge-channel.

The slave-compression-process will be terminated after one of said first-charge-channel and the second-charge-channel has a higher air-pressure than the combusting pressure of the hot-combustion-medium in the master cylinder.

During the master-intake-process and the master-compression-process, the fuel will be provided into the master cylinder with the fuel-supplying means; said fuel-supplying means can be a fuel-injector, a carburetor, a fuel pump, or a direct-fuel-injection depending on the fuel type.

The hot-combustion-process is the process that the master cylinder ignites the air-fuel-mixture with its associated ignition means (such as spark plugs or direction injection nozzles or other currently known ignition methods), the ignition timing can be set any point between 35 degree before the TDC of the master piston and 40 degree after the TDC of the master piston (for late ignition timing such as 40 degree after the TDC position, all the following processes will be shifted backward accordingly, and a larger phase-difference configuration is required).

During the hot-combustion-process, the air-fuel-mixture is combusted as the hot-combustion-medium in the master cylinder, at the same time the first-charge-output-valve and the second-charge-output-valve and the reverse-input-valve are shut. As the master piston reciprocates downward to allow the pressure of the hot-combustion-medium to drop below the threshold pressure for the initiation of the injection-process, then the hot-combustion-process will be terminated.

The injection-process will be initiated after one of the first-charge-channel and the second-charge-channel reaches a higher air-pressure than the pressure of the hot-combustion-medium, the high-density-air of the enabled charge-channel will overcome the combined force of the spring-tension on the associated charge-output-valve and the combustion pressure of the hot-combustion-medium, thereby injecting the high-density-air into the master cylinder within an extremely short time interval (about 10 milliseconds to 3 milliseconds in 2000 rpm operation).

During the injection-process the high-density-air is injected into the master cylinder at an angle to create a swirling effect while the high-density-air is mixing with the hot-combustion-medium, for the easy of referencing, the mixed medium is referred to as the cold-expansion-medium, since the mixing action will convert the carbon-monoxide into the carbon-dioxide and release more energy for expansion at low temperature (about 400 degree Celsius to 800 degree Celsius), and because of the low temperature characteristic and the swirling effect, the master cylinder wall will conduct less heat current from the cold-expansion-medium, thus reducing the heat loss.

The first-charge-output-valve and the second-charge-output-valve are preferably constructed to inject the high-density-air in different swirling direction, for example, in the first embodiment, the first-charge-output-valve is injecting to generate a clockwise swirling (as observed in the top sectional view), whereas the second-charge-output-valve is injecting to generate a counterclockwise swirling, therefore the injection-process and the cold-expansion-process of the first round of the 8-process-sequence will have a clockwise swirling effect to the cold-expansion-medium in the master cylinder, while the injection-process and the cold-expansion-process of the second round of the 8-process-sequence will have a counter-clockwise swirling effect to the cold-expansion-medium in the master cylinder.

The cold-expansion-process is the process that the cold-expansion-medium expands in both the master cylinder and the slave cylinder; during this process the reverse-input-valve and the reverse-output-valve are cam-actuated to allow the cold-expansion medium to flow through the reverse-channel into the slave cylinder, while the first-charge-output-valve and the second-charge-output-valve are shut (which allows the first-charge-channel and the second-charge-channel to cool down); the reverse-input-valve and the reverse-output-valve will start to open after the slave piston has started the slave-expansion-stroke.

For increasing the expansion efficiency of the cold-expansion-process and the reducing the pollution in light load condition, the reverse-channel can include a built-in catalytic converter, so the cold-expansion-medium of the master cylinder will pass through the catalytic converter before entering the slave cylinder.

The slave-exhaust-process is the process that the cold-expansion-medium is expelled out of the slave cylinder with a cam-actuated slave-exhaust-valve during the later part of the slave-expansion-stroke and the entire slave-exhaust-stroke.

For the basic configuration as in the first embodiment, almost all the cold-expansion-medium in the master cylinder is transferred into the slave cylinder to be expelled through the slave-exhaust-port (a portion of the cold-expansion-medium is remained due to the compression ratio in the master cylinder).

For the advanced configuration used in the high speed engine applications, an auxiliary-exhaust-valve can be installed in the master cylinder, which can be actuated to open between 540 degree and 720 degree of crankshaft reference angle to reduce the pumping loss and the heat loss through the reverse-channel in high speed engine applications, the slave exhaust valve will still open until the end of the slave-exhaust-stroke to expel the cold-expansion-medium out of the slave cylinder.

Now referring to FIG. 1A to FIG. 1H for the structural description of the first embodiment, the basic components of the swirl-injection type eight-stroke engine are labeled as follows, the master-intake-port 101, the master-intake-valve 112, the master piston 111, the master cylinder 110, the slave-intake-valve 122, the slave-intake-port 102, the slave-exhaust-port 109, the slave-exhaust-valve 129, the slave piston 121, the slave cylinder 120, the reverse-channel 160, the reverse-input-valve 161, the reverse-output-valve 162, the first-charge-channel 130, the second-charge-channel 140, the first-charge-input-valve 131, the second-charge-input-valve 141, the first-charge-output-valve 132, the second-charge-output-valve 142, the alternating-charge cam system 180, the ignition means 118, the fuel-supplying means 119.

The first embodiment is based on the configuration of 90 degree phase difference, it should be noted that the phase-difference can vary from 60 degree to 150 degree to operate with the 8-process-sequence while sustaining a reasonable fuel efficiency over 35%; the 8-process-sequence of 90 degree phase-difference are shown in Operation Table.1, while the alternative configurations are demonstrated in Operation Table.2 and Operation Table.3 with various phase-differences (75 degree and 150 degree).

Now explaining FIG. 1A to FIG. 1H with reference to Operation Table.1 Part A and Operation Table.1 Part B:

As shown in FIG. 1A the eight-stroke engine is in the beginning of the master-intake-process at about 30 degree of crankshaft reference angle, the master piston 111 is moving downward, the master-intake-valve 112 is open to admit the air into the master cylinder 110, the slave piston 121 is moving upward to expel the cold-expansion-medium of the last round of the eight-stroke-operation.

Figure 1B:
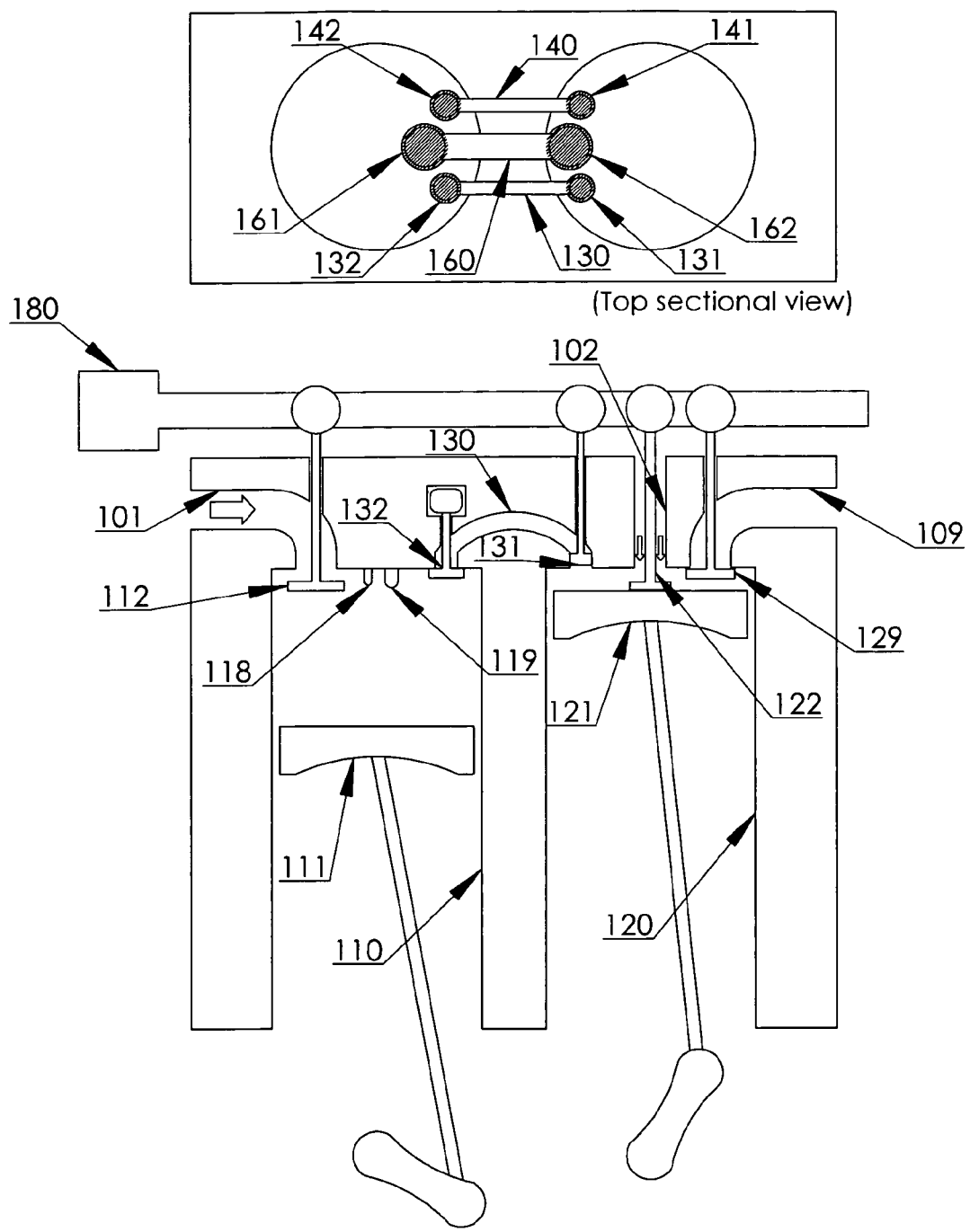

As shown in FIG. 1B the eight-stroke engine is in the beginning of the slave-intake-process at about 120 degree of crankshaft reference angle, the slave piston 121 is moving downward, the slave-intake-valve 122 is open to admit the air into the slave cylinder 120, the master cylinder 110 is in the later stage of the master-intake-process.

Figure 1C:
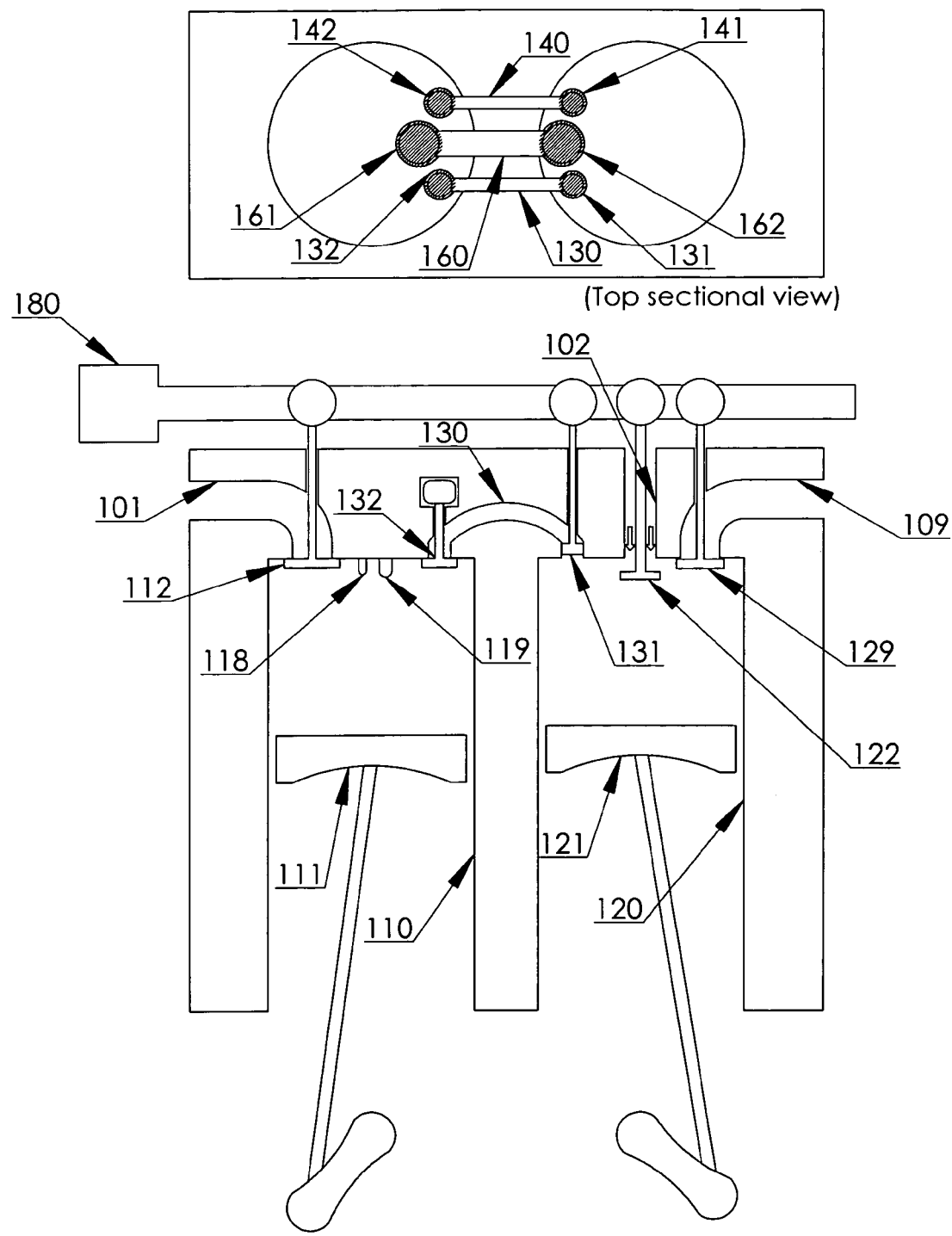

As shown in FIG. 1C the eight-stroke engine is in the beginning of the master-compression-process at about 220 degree of crankshaft reference angle, the master-intake-valve 112 is shut, the reverse-input-valve 161 is shut, and the air in the master cylinder 110 is compressed with the master piston 111.

As shown in FIG. 1Dcw the eight-stroke engine is in the beginning of the slave-compression-process at about 290 degree of crankshaft reference angle, the slave-intake-valve 122 is shut, the first-charge-input-valve 131 is open to allow the air into the first-charge-channel 130, (the second-charge-channel 140 is disabled in the first round of the eight-stroke-operation in this configuration, the first-charge-input-valve 131 and the second-charge-input-valve 141 will be actuated in alternating turns to enable one of the first-charge-channel 130 and the second-charge-channel 140).

As shown in FIG. 1Ecw the eight-stroke engine is in the beginning of the hot-expansion-process at about 365 degree of the crankshaft reference angle, the air-fuel-mixture are combusting in the master cylinder 110 as the hot-combustion-medium with the ignition means 118, at the same time the enabled charge-channel (the first-charge-channel 130) will continue to increase its air-pressure therein until the threshold pressure of the initiation of the injection process is reached.

The threshold pressure of the initiation of the injection process is defined as the air-pressure that is sufficient to overcome the spring-tension of its associated charge-output-valve and the combustion pressure of the hot-combustion-medium; depending on the configurations of the eight-stroke engine, the injection-process may be initiated at any point between the first 30 degree of the master-expansion-stroke and the last 30 degree of the slave-compression-stroke; in other words the injection-process may start between 30 degree after the TDC position of the master piston (the master-expansion-stroke) and 30 degree before the TDC position of the slave piston (the slave-compression-stroke).

The total duration of injection-process may range from 5 degree to 60 degree of crankshaft rotation depending on the spring strength and the engine rpm.

As shown in FIG. 1Fcw the eight-stroke engine is in the beginning of the injection-process at about 420 degree of crankshaft reference angle, the high-density-air in the enabled charge-channel (first-charge-channel 130) will be injected into the master cylinder 110 to swirl and mix with hot-combustion-medium to form a cold-expansion-medium; the enabled charge-output-valve (the first-charge-output-valve 132) may be shut before the slave piston 121 reaches TDC position if the air-pressure of the enabled charge-channel drops to below the pressure of the master cylinder 110; as the alternating-charge cam system 180 will enable each charge-channel in an alternating order, so that the two-direction swirling effect will reduce the surface temperature of the master cylinder wall and the master cylinder head, thereby maintaining a low heat loss environment for power generation.

Figure 1G:
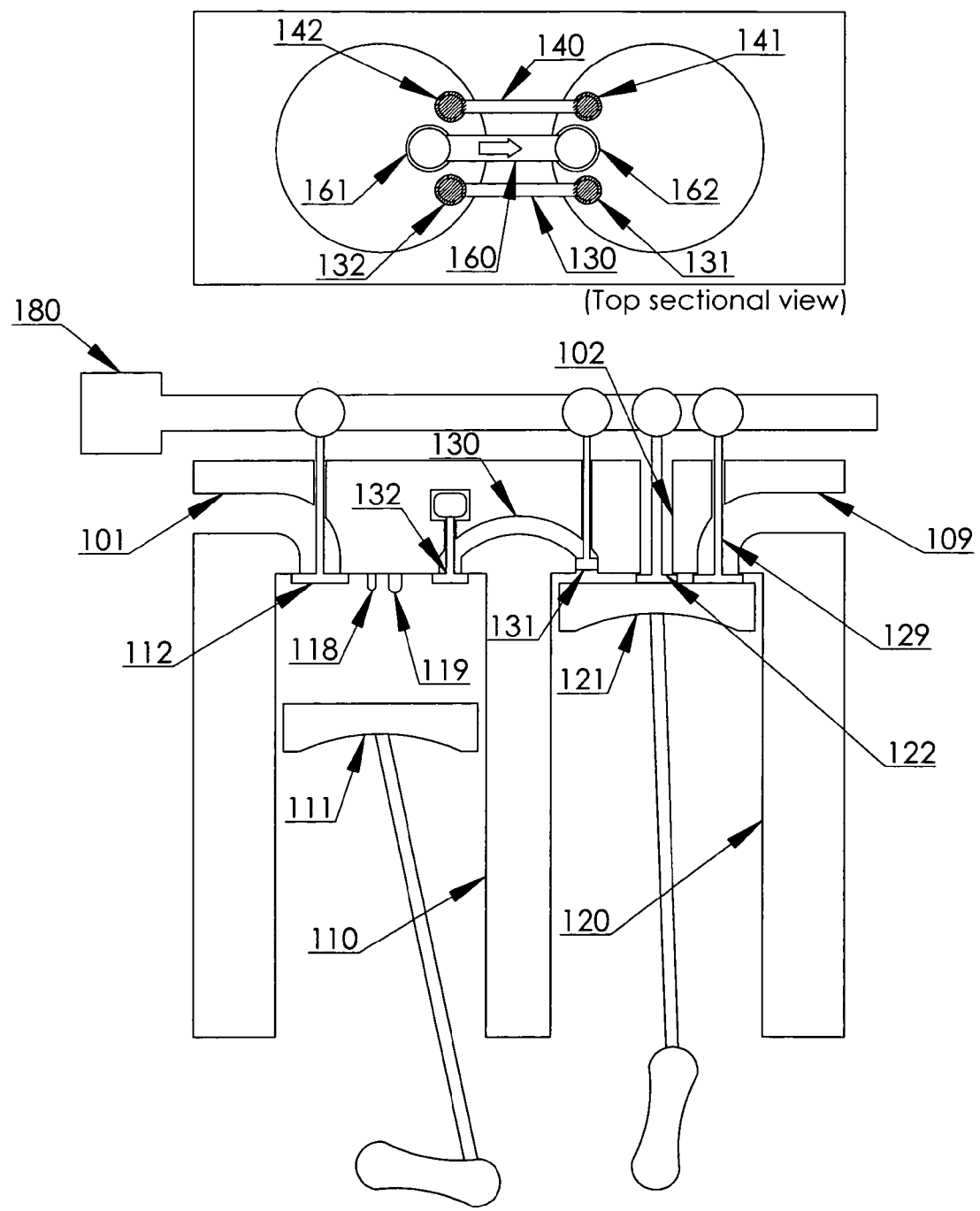

As shown in FIG. 1G the eight-stroke engine is in the beginning of the cold-expansion-process at about 460 degree of crankshaft reference angle, the cold-expansion-medium will then expand in both the master cylinder 110 and the slave master cylinder 120 after both the reverse-input-valve 161 and the reverse-output-valve 162 are cam-actuated to establish a direct air passage from the master cylinder to the slave cylinder (the first-charge-channel 130 and the second-charge-channel 140 should be considered as one-way channel from the slave cylinder 120 to the master cylinder 110).

Figure 1H:
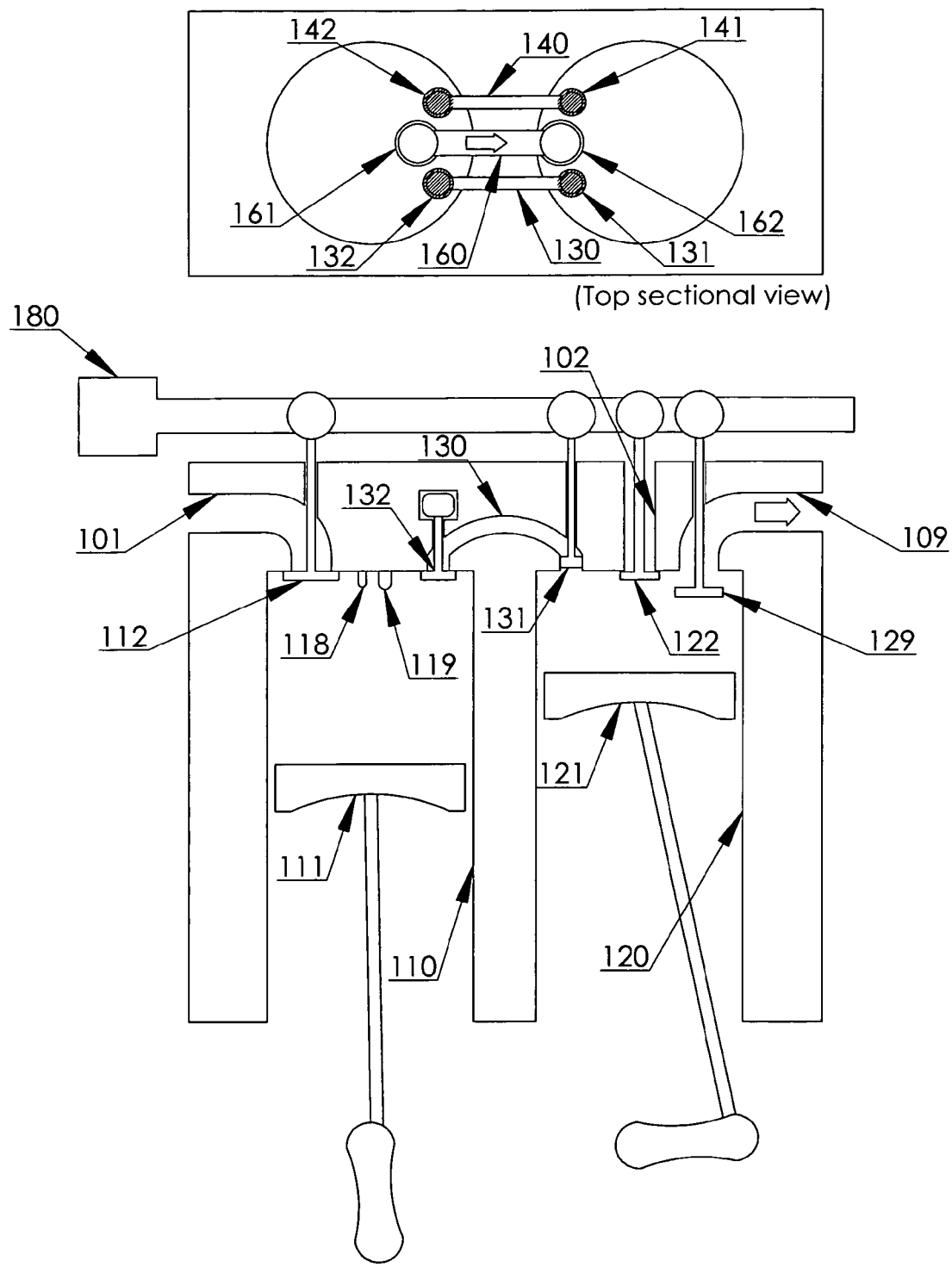

As shown in FIG. 1H the eight-stroke engine is in the beginning of the slave-exhaust-process at about 535 degree of crankshaft reference angle (the slave-exhaust-valve 129 may open in the range from 520 degree of crankshaft reference to about the end of the slave-exhaust-stroke depending on the engine applications); during this process, the cold-expansion-medium is expelled through the slave-exhaust-port 109.

For the second round of the eight-stroke-operation (720 degree to 1530 degree of crankshaft reference), wherein FIG. 1A, FIG. 1B, FIG. 1C, FIG. 1G, FIG. 1H are basically the same as in the first round of the eight-stroke-operation, except the following FIG. 1Dccw, FIG. 1Eccw, and FIG. 1Fccw.

As shown in FIG. 1Dccw is the beginning of the slave-compression-process at about 1010 degree of crankshaft reference angle, the slave-intake-valve 122 is shut, the second-charge-input-valve 132 is open to allow the air into the second-charge-channel 130, the first-charge-channel 130 is disabled in this second round of the eight-stroke-operation.

As shown in FIG. 1Eccw is in the beginning of the hot-expansion-process at about 1085 degree of the crankshaft reference angle, the air-fuel-mixture are combusting in the master cylinder 110 as the hot-combustion-medium with the ignition means 118, at the same time the enabled charge-channel (the second-charge-channel 140) will continue to increase its air-pressure therein until the threshold pressure of the initiation of the injection process is obtained.

As shown in FIG. 1Fccw is in the beginning of the injection-process at about 1140 degree of crankshaft reference angle, the high-density-air in the enabled charge-channel (second-charge-channel 140) will be injected into the master cylinder 110 to swirl and mix with hot-combustion-medium to form a cold-expansion-medium; the enabled charge-output-valve (the first-charge-output-valve 131) may be shut before the slave piston 121 reaches TDC position if the air-pressure of the enabled charge-channel drops to below the overall pressure in the master cylinder 110; as the alternating-charge cam system 180 will enable each charge-channel in an alternating order, so that the two-direction swirling effect will reduce the surface temperature of the master cylinder wall and the master cylinder head and maintain a low heat loss environment for power generation.

Figure 1I:
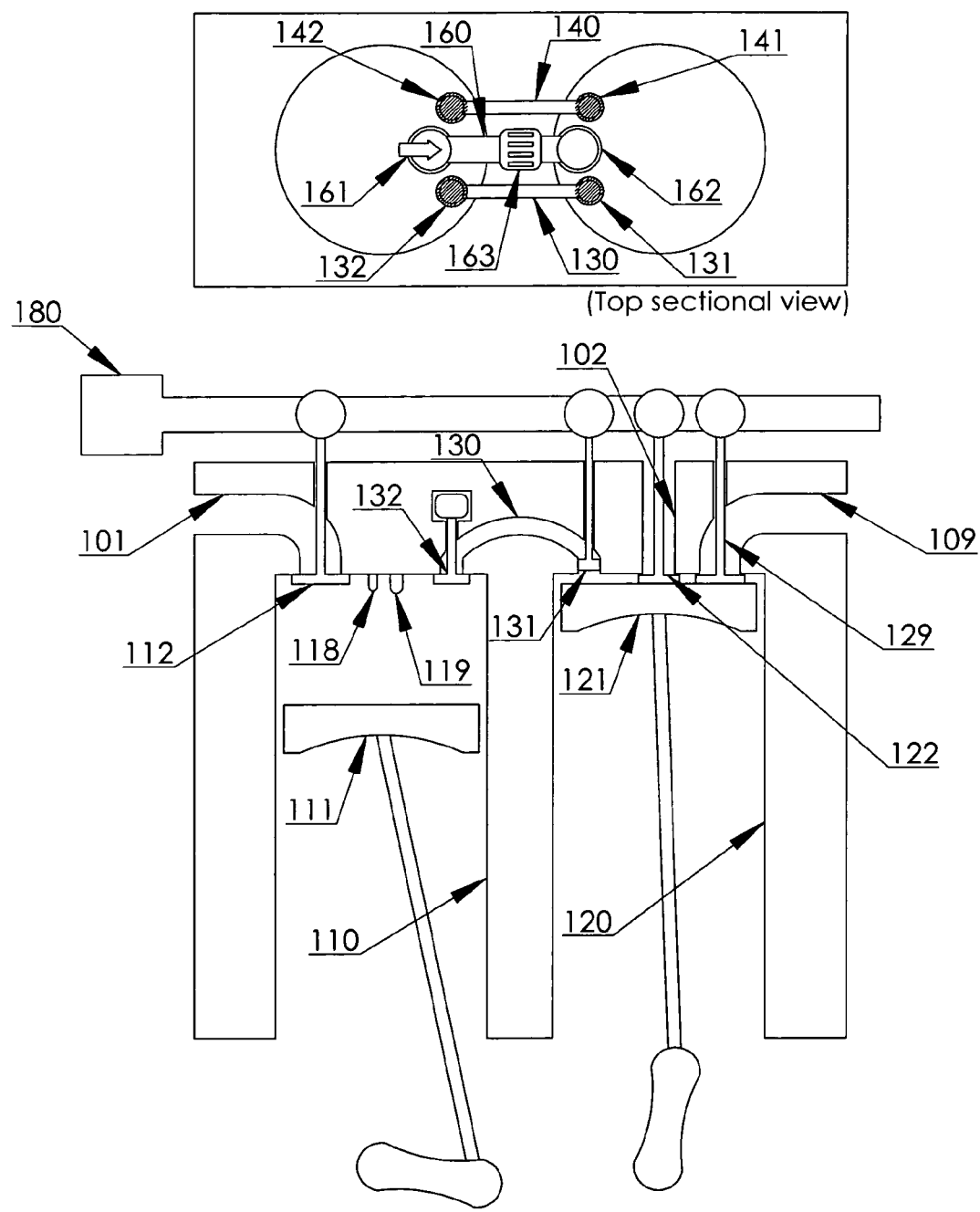
FIG. 1I shows an eight-stroke engine with built-in catalytic converter in the reverse-channel.
Figure 1J:
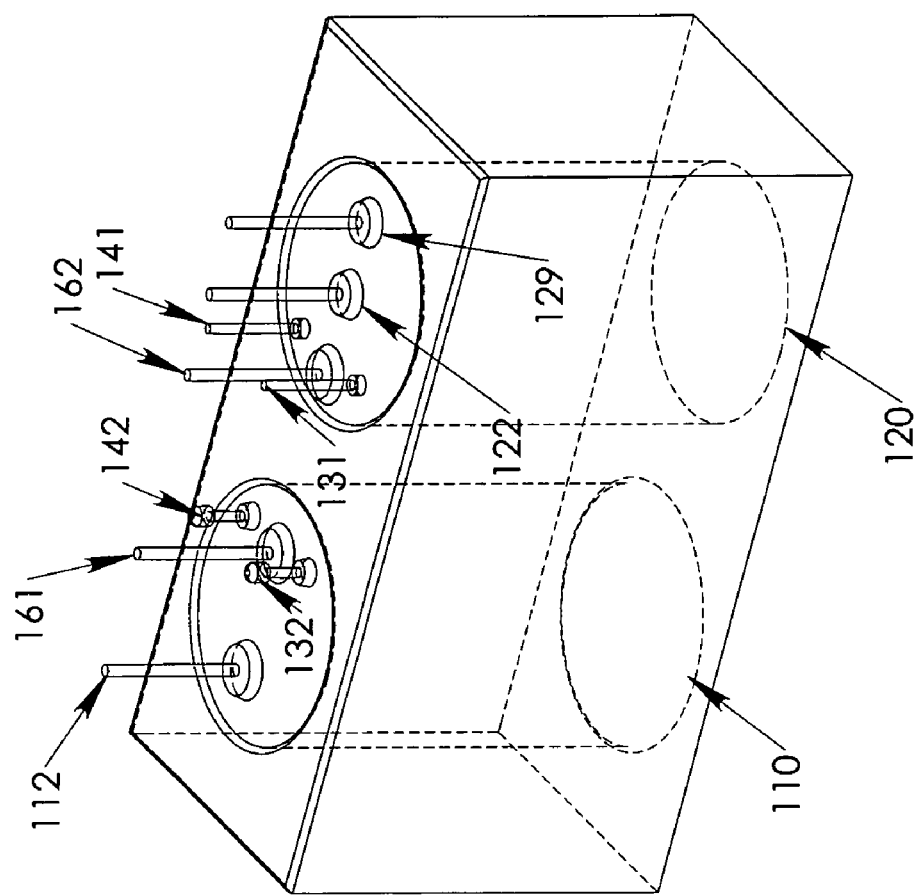
FIG. 1J is an isometric illustrative view of the valve positions without engine head and piston.
Figure 1K:
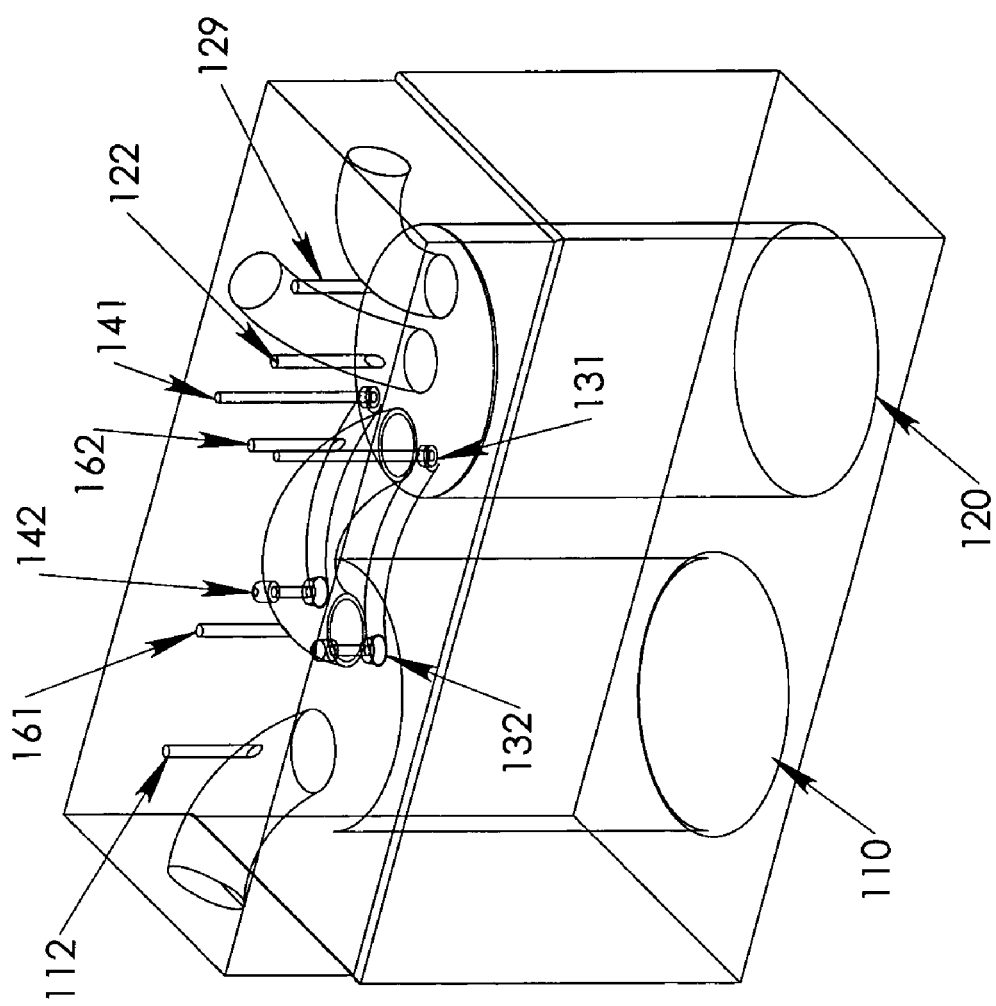
FIG. 1K is an isometric illustrative view of the master-intake-port, the slave-intake-port, the first-charge-channel, the second-charge-channel, the reverse-channel, and the slave-exhaust-port.

Referring to FIG. 1I, the reverse-channel 160 has included a built-in catalytic converter 163, so the cold-expansion-medium of the master cylinder 110 will pass through the catalytic converter before entering the slave cylinder.

Various cylinder arrangements can be employed with the swirl-injection type eight-stroke engine, the master piston and the slave-piston can be connected with single crankshaft or two separate crankshafts coupled with gears.

A simple double-crankshaft-inline cylinder arrangement can be constructed with an inline block for slave cylinders and an inline block for master cylinders, wherein the master piston and the slave piston will be connected with separate crankshafts.

Figure 3:
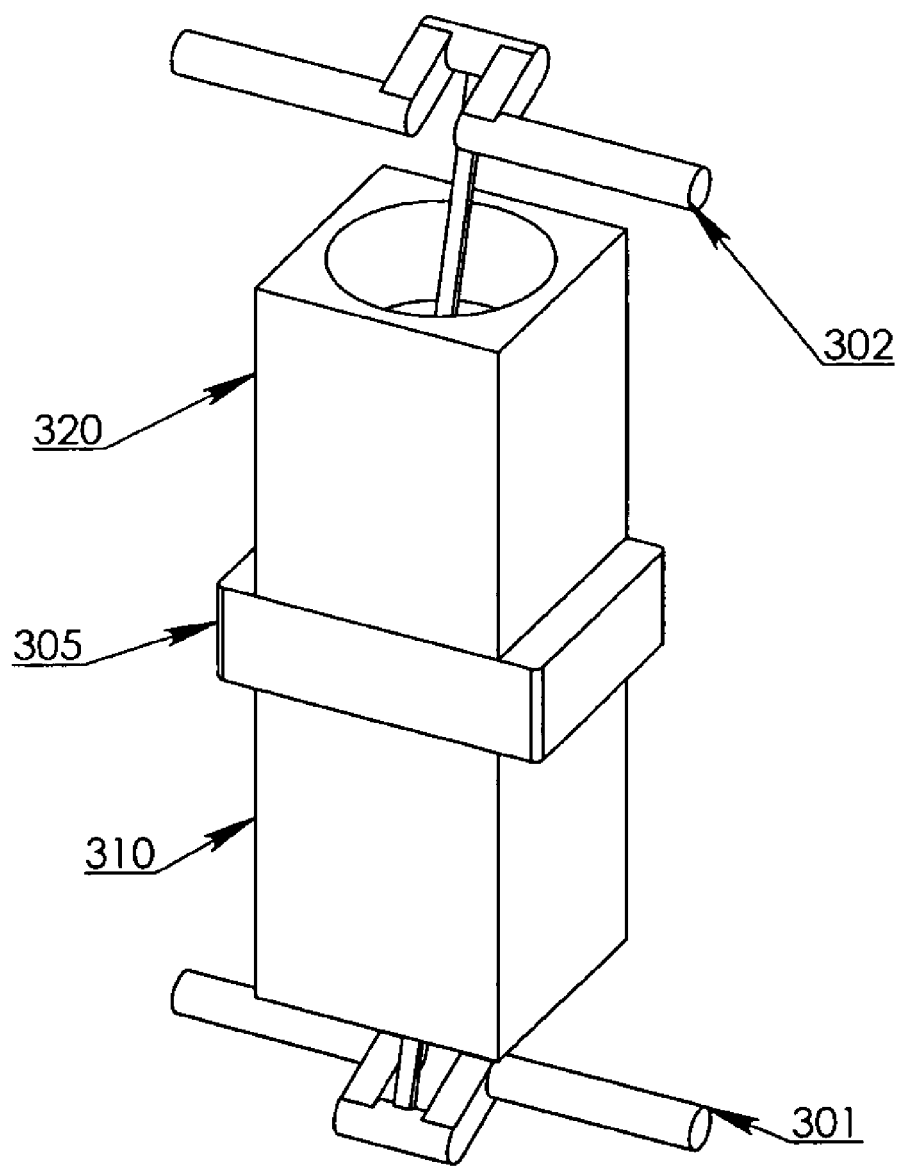
FIG. 3 shows an advanced configuration of the eight-stroke engine, the flat type eight-stroke engine, wherein the pumping loss to increase fuel efficiency.

An example of the alternative cylinder arrangements is to dispose the master cylinder and the slave so that the master piston and the slave piston reciprocate towards each other as in the flat-type cylinder arrangement as shown in FIG. 3, wherein the cold-expansion-medium can expand with minimum energy due to the inertia of the air-flow, the components are labeled as the master-crankshaft 301, the master cylinder block 310, the engine head 305, the slave cylinder block 320, the slave-crankshaft 302.

Figure 2:
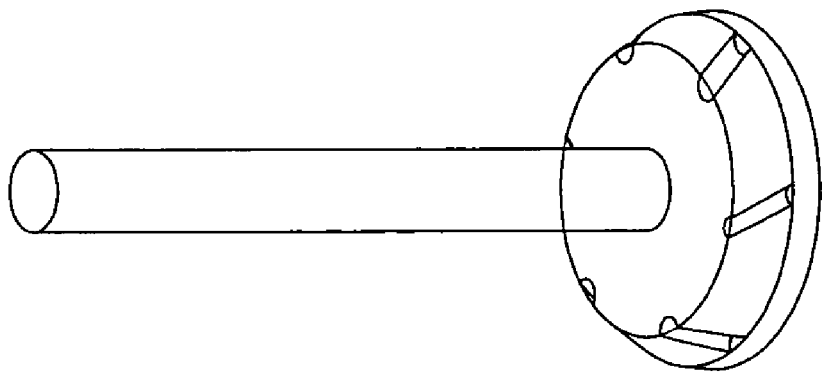
FIG. 2 shows an example of the charge-output-valve with the air-guiding-grooves.
Figure 4:
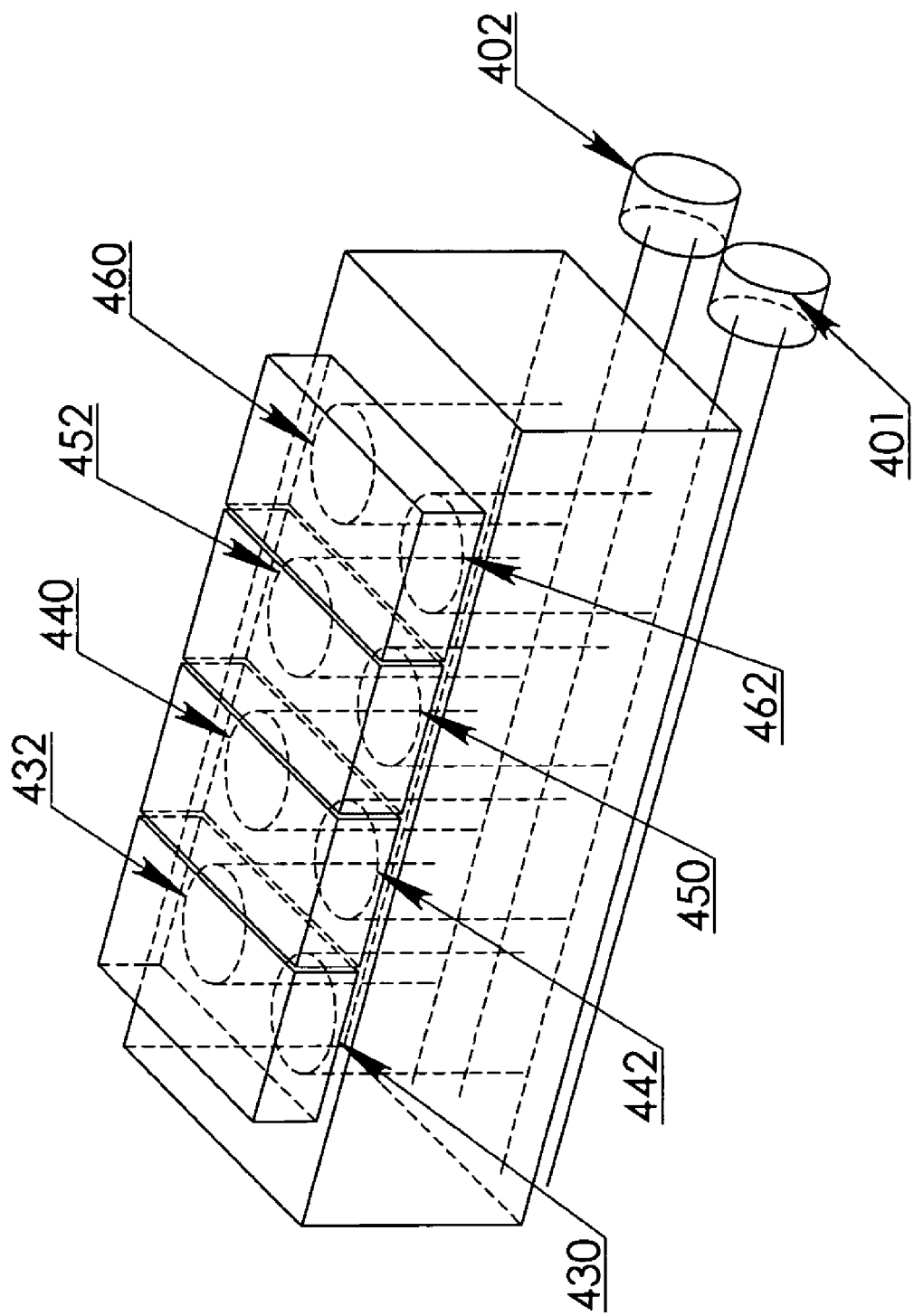
FIG. 4 shows the alternating-firing cylinder arrangement of the eight-stroke engine, wherein the master piston and the piston cylinder are coupled to the master crankshaft and the slave crankshaft in an alternative order.

The first-charge-output-valve and the second-charge-output valve can be constructed with the air-guiding-grooves as shown in FIG. 2 to enhance the mixing effect during the injection process. Another example of the cylinder arrangements is shown in FIG. 4, wherein the master cylinder and the slave cylinder are connected to the first crankshaft and the second crankshaft in alternating order; the first master cylinder 430 is co-acting with the first slave cylinder 432, the second master cylinder 440 is co-acting with the second slave cylinder 442, the third master cylinder 450 is co-acting with the third slave cylinder 452, the fourth master cylinder 460 is co-acting with the fourth slave cylinder 462; the first master cylinder 430 and the third master cylinder 450 is connected to the first crankshaft 401, the second master cylinder 440 and the fourth master cylinder 460 is connected to the second crankshaft 402, whereas the first slave cylinder 432 and the third slave cylinder 452 is connected to the second crankshaft 402, the second slave cylinder 442 and the fourth slave cylinder 462 is connected to the first crankshaft 401.

Figure 5:
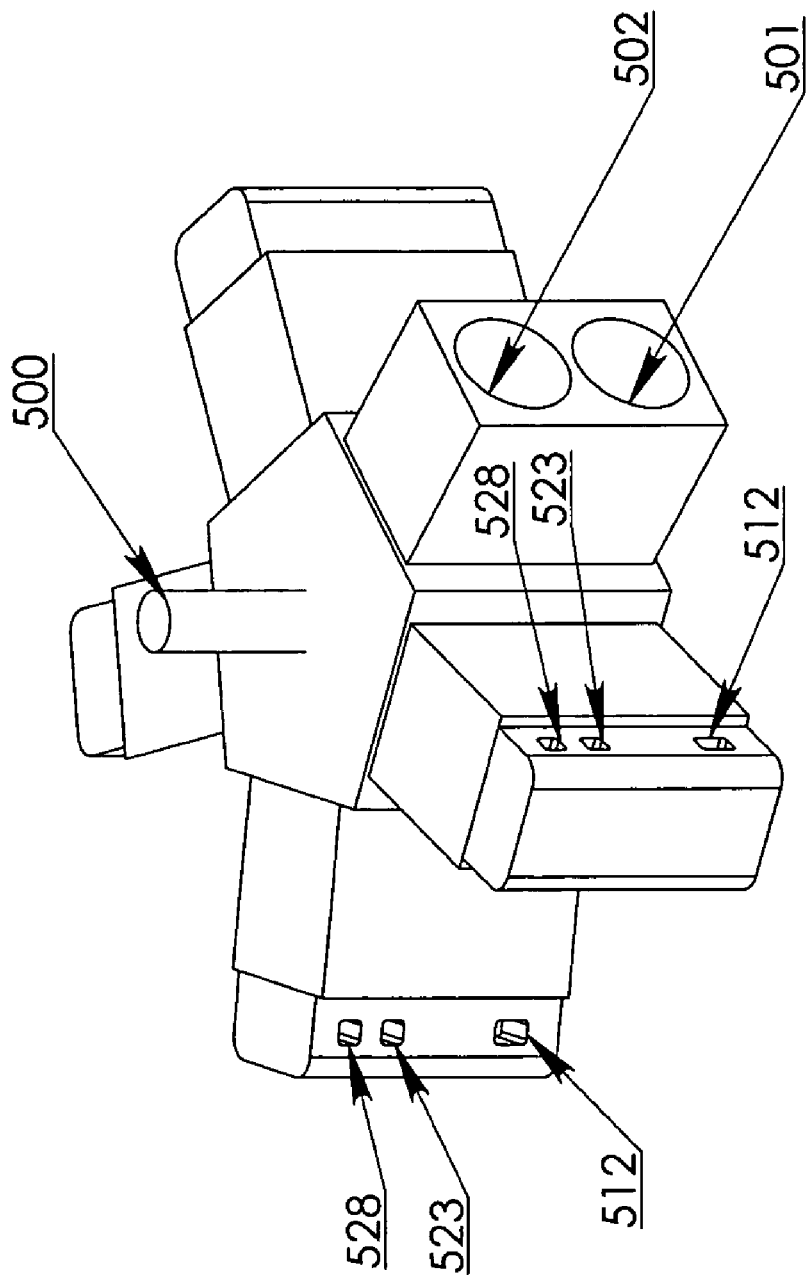
FIG. 5 shows an alternative cylinder arrangement of the eight-stroke engine, the radial type eight-stroke engine; wherein the mechanical loss and the engine vibration can be greatly reduced.

For further improving the fuel efficiency by reducing the mechanical loss and vibration, a radial type eight-stroke engine can be constructed as in FIG. 5, wherein, the radial type eight-stroke consists of at least 3 pairs of co-acting master cylinder 501 and slave cylinder 502; the components in FIG. 5 are labeled as the master cylinder 501, the slave cylinder 502, the output shaft 500, the master-intake-port 512, the slave-intake-port 523, the slave-exhaust-port 528.

The swirl-injection type eight-stroke engine of the gasoline type can further include an alternating-spark system with more than two spark plugs, wherein the spark plugs are ignited in different positions to optimize the two-direction swirling effect in the master cylinder.

For large engine application, the swirl-injection type eight-stroke engine can further comprises additional charge-channels with the required charge-output-valves and the charge-input valves to operate with the alternating-charge cam system; for example, when three charge-channel is installed, the charge-output-valve of each charge-channel can be constructed with three different injection angles so that the high-density-air and the hot-combustion-medium can swirl and mix in three different directions to reduce the heat loss in the master cylinder.

The invention claimed is:

1. A swirl-injection type eight-stroke engine comprising:
    a) a master cylinder (110) and a slave cylinder (120) for performing the eight-stroke-operation with the 8-process-sequence; said eight-stroke-operation includes the master-intake-stroke, the slave-intake-stroke, the master-compression-stroke, the slave-compression-stroke, the master-expansion-stroke, the slave-expansion-stroke, the master-exhaust-stroke, and the slave-exhaust stroke; said 8-process-sequence includes the master-intake-process, the slave-intake-process, the master-compression-process, the slave-compression-process, the hot-combustion-process, the injection-process, the cold-expansion-process, the slave-exhaust-process;
    b) said master cylinder (110) includes fuel-supplying means (119) and ignition means (118) for initiating the hot-combustion-process;
    c) said master cylinder (110) includes a master-intake-valve (112) for admitting air into the master cylinder (110) during the master-intake-process;
    d) said slave cylinder (120) includes a slave-intake-valve (122) for admitting air into the slave cylinder (120) during the slave-intake-process;
    e) said slave cylinder (120) includes a slave-exhaust-valve (129) for expelling a flow of cold-expansion-medium out of the slave cylinder (120) during the slave-exhaust-process;
    f) an alternating-charge cam system (180) and at least two charge-channels (130 and 140), which are the first-charge-channel (130) and the second-charge-channel (140); each of said charge-channel includes a charge-input-valve for admitting the air from the slave cylinder (120), which are the first-charge-input-valve (131) and the second-charge-input-valve (141); each of said charge-channels includes a charge-output-valve for injecting the high-density-air into the master cylinder (110), which are the first-charge-output-valve (132) and the second-charge-output-valve (142); said alternating-charge cam system (180) will enable one of said first charge-channel (130) and the second-charge-channel (140) by actuating the associated charge-input-valve in alternating turns, and the enabled charge-channel will be charged with the air from the slave cylinder to initiate the injection-process after the air-pressure of the enabled charge-channel has reached the threshold pressure;
    g) said first-charge-output-valve (132) and second-charge-output-valve (142) will alternately inject a flow of high-density-air into the master cylinder (110) at different injection angles to create a swirling effect in the master cylinder during the injection-process; a cold-expansion-medium is formed by mixing said flow of high-density-air and a hot-combustion-medium in the master cylinder (110), thereby reducing the heat loss of the master cylinder (110);
    h) a reverse-channel (160) for transferring the cold-expansion-medium from the master cylinder (110) to the slave cylinder (120) after the slave piston (121) has started the slave-expansion-stroke; the cold-expansion-medium will expand in both the master cylinder (110) and the slave cylinder (120).

2. A swirl-injection type eight-stroke engine as defined in claim 1, wherein, the master piston (111) and the slave piston (121) are constructed with a phase-difference between 60 degree and 150 degree.

3. A swirl-injection type eight-stroke engine as defined in claim 2, wherein, the reverse-channel (160) includes a catalytic converter to improve the efficiency of the cold-expansion-process.

4. A swirl-injection type eight-stroke engine as defined in claim 2, wherein said charged-output-valves are constructed to inject the high-density-air in different circulation directions with swirling effect.

5. A swirl-injection type eight-stroke engine as defined in claim 2, wherein the master piston (111) and the slave piston (121) can be connected with two separate crankshafts, and said two crankshafts are synchronized with gears.

6. A swirl-injection type eight-stroke engine as defined in claim 3, wherein, the ignition means can be an alternating-spark system with more than two spark plugs.

7. A swirl-injection type eight-stroke engine as defined in claim 2, wherein; the master cylinder (110) further comprises an auxiliary-exhaust-valve to expel the cold-expansion-medium out of the master cylinder (110) during the master-exhaust-stroke.

8. A swirl-injection type eight-stroke engine comprising:
    a) an eight-stroke engine operating with the 8-process-sequence, and said eight-stroke engine includes a master cylinder (110), a slave cylinder (120), a master-intake-valve (112), a slave-intake-valve (122), a slave-exhaust-valve (129), a first-charge-channel (130), a second-charge-channel (140), a reverse-channel (160), ignition means (118) and fuel-supplying means (119), an alternating-charge cam system (180), and the control valves for controlling said first-charge-channel (130) and second-charge-channel (140) and reverse-channel (160);

b) said alternating-charge cam system (180) will alternately enable one of said first-charge channel (130) and second-charge-channel (140) by actuating the associated control valves;

c) said master piston (111) and slave piston (121) operates in the eight-stroke-operation, which consists of the master-intake-stroke, the slave-intake-stroke, the master-compression-stroke, the slave-compression-stroke, the master-expansion-stroke, the slave-expansion-stroke, the master-exhaust-stroke and the slave-exhaust-stroke;

d) the first process of the 8-process-sequence is the master-intake-process, which is the process to intake the air into the master cylinder (110) with said master-intake-valve (112);

e) the second process of the 8-process-sequence is the slave-intake-process, which is the process to intake the air into the slave cylinder (120) with said slave-intake-valve (122);

f) the third process of the 8-process-sequence is the master-compression-process, which is the process to compress the air in the master cylinder (110);

g) the fourth process of the 8-process-sequence is the slave-compression-process, which is the process to compress the air of slave cylinder into one of said first-charge-channel (130) and second-charge-channel (140) as a high-density-air;

h) the fifth process of the 8-process-sequence is the hot-combustion-process, which is the process to ignite an air-fuel-mixture as a hot-combustion-medium in said master cylinder (110);

i) the sixth process of the 8-process-sequence is the injection-process, which is the process to inject the high-density-air of the enabled charge-channel into the master cylinder (110); the high-density-air is injected at an angle capable of creating a swirling effect while mixing with the hot-combustion-medium to from a cold-expansion-medium;

j) the seventh process of the 8-process-sequence is the cold-expansion-process, which is the process that the cold-expansion-medium expands in both the master cylinder (110) and the slave cylinder (120) after the reverse-channel (160) is opened to provide a flow passage during the slave-expansion-stroke;

k) the eighth process of the 8-process-sequence is the slave-exhaust-process, which is the process to expel the cold-expansion-medium out of the slave cylinder (120) with the slave-exhaust-valve (129).

9. A swirl-injection type eight-stroke engine as defined in claim 8, wherein, the master piston (111) and the slave piston (121) are constructed with a phase-difference 60 degree and 150 degree.

10. A swirl-injection type eight-stroke engine as defined in claim 9, wherein, the reverse-channel (160) includes a catalytic converter (163) to improve the efficiency of the cold-expansion-process.

11. A swirl-injection type eight-stroke engine as defined in claim 8, wherein said charged-output-valves are constructed to inject the high-density-air in different circulation directions with swirling effect.

12. A swirl-injection type eight-stroke engine as defined in claim 11, wherein, the ignition means can be an alternating-spark system with more than two spark plugs.

13. A swirl-injection type eight-stroke engine as defined in claim 9, wherein the master piston (111) and the slave piston (121) can be synchronized with two separate crankshafts and gears to perform the eight-stroke-operation.

14. A swirl-injection type eight-stroke engine as defined in claim 9, wherein; the master cylinder further comprises an auxiliary-exhaust-valve to expel the air out of the master cylinder during the master-exhaust-stroke.

15. A swirl-injection type eight-stroke engine as defined in claim 8 can further comprises additional charge-channels and control valves for operating with the alternating-charge cam system.

16. A swirl-injection type eight-stroke engine comprising:

a) a master cylinder (110) and a slave cylinder (120) operating with the 8-process-sequence;

b) said master cylinder (110) includes a reciprocating master piston (111), which will perform the master-intake-stroke, the master-compression-stroke, the master-expansion-stroke, the master-exhaust-stroke;

c) said slave cylinder (120) includes a reciprocating slave piston (121), which will perform the slave-intake-stroke, the slave-compression-stroke, the slave-expansion-stroke, the slave-exhaust-stroke;

d) a first-charge-channel (130) and a second-charge-channel (140) for alternately providing an one-way passage from the slave cylinder (120) to the master cylinder (110); said first-charge-channel (130) includes a cam-actuated first-charge-input-valve (131) to admit the air from the slave cylinder (120); said second-charge-channel (140) includes a cam-actuated second-charge-input-valve (141) to admit the air from the slave cylinder (120);

e) an alternating-charge cam system (180) for alternately actuating the first-charge-input-valve (131) and the second-charge-input-valve (141);

f) said first-charge-channel (130) includes a first-charge-output-valve (132), which will be actuated by the pressure difference between the first-charge-channel (130) and the master cylinder (110); said first-charge-output-valve (132) will be opened when the air pressure of the first-charge-channel (130) is higher than the combined force of the spring tension on the first-charge-output-valve (132) and the combustion pressure in the master cylinder (110) at the end of the hot-combustion-process;

g) said second-charge-channel (140) includes a second-charge-output-valve (142), which will be actuated by the pressure difference between the second-charge-channel (140) and the master cylinder (110); said second-charge-output-valve (142) will be opened when the air pressure of the second-charge-channel (140) is higher than the combined force of the spring tension on the second-charge-output-valve (142) and the combustion pressure in the master cylinder (110) at the end of the hot-combustion-process.

17. A swirl-injection type eight-stroke engine as defined in claim 16, wherein, wherein, the master piston (111) and the slave piston (121) are constructed with a phase-difference 60 degree and 150 degree.

18. A swirl-injection type eight-stroke engine as defined in claim 17, wherein, the reverse-channel (160) includes a catalytic converter (163) to improve the efficiency of the cold-expansion-process.

19. A swirl-injection type eight-stroke engine as defined in claim 16, wherein, the ignition means can be an alternating-spark system with more than two spark plugs.

20. A swirl-injection type eight-stroke engine as defined in claim 16, wherein the master piston and the slave piston can be synchronized with two separate crankshafts and gears to perform the eight-stroke-operation.

\* \* \* \* \*